(12) United States Patent
Assouad

(10) Patent No.: US 6,282,501 B1
(45) Date of Patent: Aug. 28, 2001

(54) DISK DRIVE TESTING

(75) Inventor: Nicolas C. Assouad, Niwot, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/175,586

(22) Filed: Oct. 20, 1998

(51) Int. Cl.$^7$ .............................. G11B 5/09; G11B 19/02
(52) U.S. Cl. ...................... 702/117; 702/185; 702/186; 360/3; 360/53
(58) Field of Search .................................. 702/117, 183, 702/185, 186, 182, 184; 360/3, 53, 78.07, 78.09; 369/47

(56) References Cited

U.S. PATENT DOCUMENTS

| | | | |
|---|---|---|---|
| 5,953,689 | * | 9/1999 | Hale et al. ............................ 702/186 |
| 5,978,752 | * | 11/1999 | Morris .................................. 702/186 |
| 5,987,400 | * | 11/1999 | Hirano ................................. 702/186 |

* cited by examiner

Primary Examiner—Marc S. Hoff
Assistant Examiner—Hien Vo
(74) Attorney, Agent, or Firm—Patton Boggs LLP

(57) ABSTRACT

The invention includes a method and integrated circuit for testing a disk drive. The invention internally generates test inputs to the host interface in the disk drive. The test inputs emulate the actual inputs that a host computer would provide to the host interface. One version of the invention includes a drive control integrated circuit. The drive control integrated circuit comprises: a host interface, a processor, a buffer control, and compare circuitry. The processor processes test instructions to initiate a test pointer. The buffer control transfers commands from a buffer to the host interface in response to the pointer. The processor controls a write operation and a read operation in response to the commands. The compare circuitry compares the data block that is written to the address with another data block that is read from the address. The compare circuitry generates an alarm if the data blocks do not match.

13 Claims, 5 Drawing Sheets

DISK DRIVE TESTING

BACKGROUND OF THE INVENTION

1. Field of the Invention

The invention is related to the field of disk drive systems, and in particular, to a drive control integrated circuit that performs robust testing on the disk drive without host computer input.

2. Statement of the Problem

Host computers store data on disk drives. The disk drive industry is extremely competitive, so the cost and reliability of disk drives are critically important to industry success. Robust testing is required to ensure the reliability of a disk drive.

Unfortunately, robust testing also increases the cost of the disk drive.

A disk drive operates in response to commands from a host computer. Past testing methods have emulated these host commands to simulate field conditions in a robust manner. Unfortunately, expensive test systems and labor were required to interconnect the disk drives with the test systems and perform the tests.

To avoid the cost of these test systems and labor, internal test software was developed for the disk drive. The test software was loaded into the disk drive and executed by a drive control integrated circuit. The internal software partially emulated field conditions, but did not simulate inputs to the host interface of the disk drive. Thus, the host interface and host interface processing were not tested.

SUMMARY OF THE SOLUTION

The invention solves the above problem with a method and integrated circuit for testing a disk drive. The invention internally generates and provides test commands to the host interface in the disk drive. The test inputs emulate the actual commands that a host computer would provide to the host interface. Thus, the invention provides robust testing without complex and expensive test equipment and labor.

One version of the invention includes a drive control integrated circuit. The drive control integrated circuit comprises: a host interface, a processor, a buffer control, and compare circuitry. The processor senses a test mode and initiates a test pointer. The buffer control transfers test commands to the host interface based on the test pointer. The processor controls a write operation and a read operation in response to the commands in the host interface. The compare circuitry compares the data block from the write operation with the data block from the read operation and generates an alarm if the data blocks do not match.

DETAILED DESCRIPTION OF THE INVENTION

Figure 1:
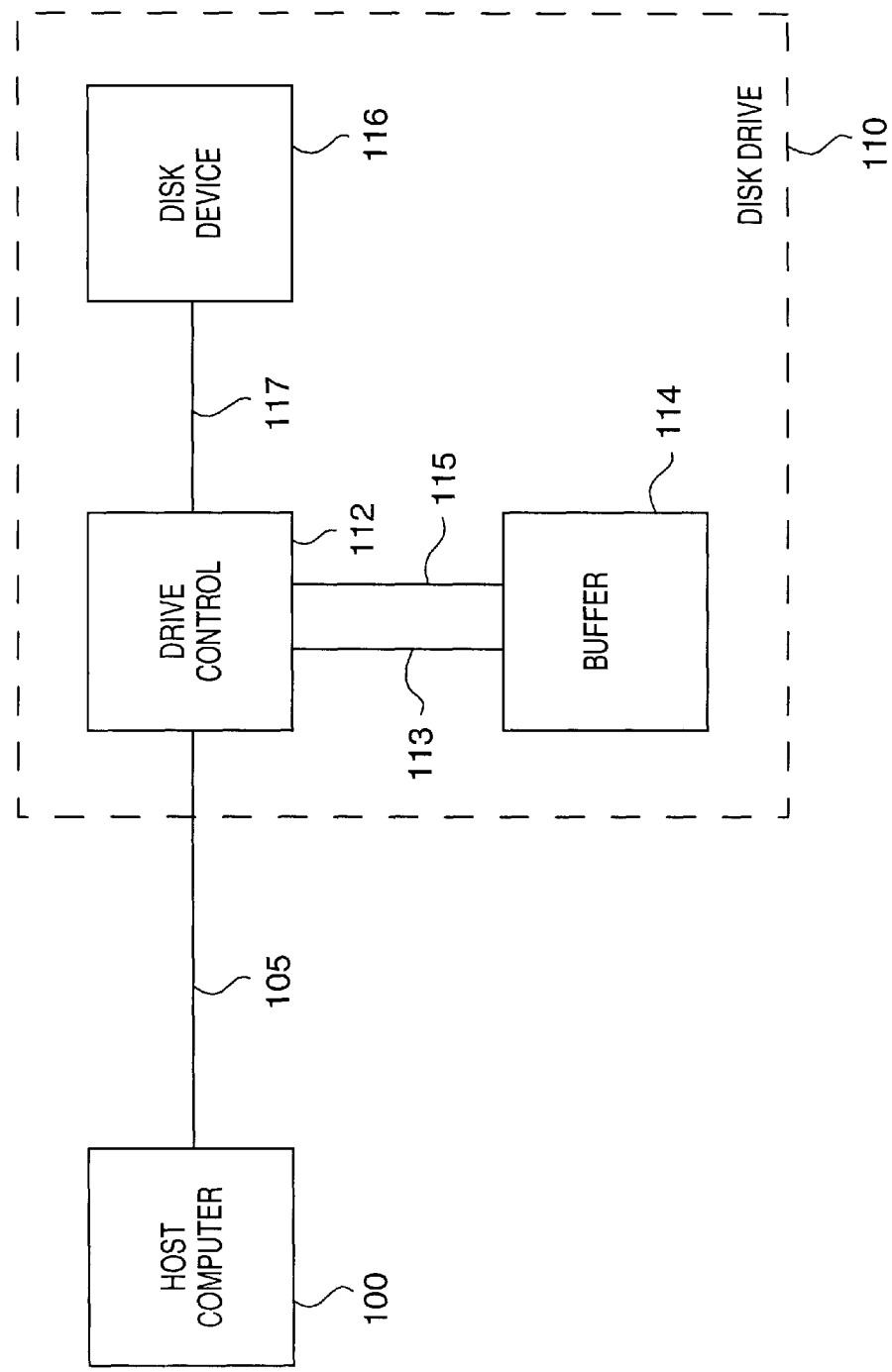
FIG. 1 is a block diagram of a host computer and a disc drive.

System Configuration and Operation—FIG. 1

The normal configuration and operation of the disk drive 110 in the field is first described to better understand a subsequent discussion of system testing. FIG. 1 depicts a host computer 100 connected to a disk drive 110 over a bus 105. The host computer 100 reads and writes data to the disk drive 110 over the bus 105. The host computer 100 could be a conventional PC. The bus 105 could be a conventional communications link, such as an ATA bus.

The disk drive 110 is comprised of a drive control integrated circuit 112, a buffer 114, and a disk device 116. The drive control integrated circuit 112 is connected to the host computer 100 over the bus 105. The drive control integrated circuit 112 is connected to the buffer 114 over bus 113 and bus 115. The drive control integrated circuit 112 is connected to the disk device 116 over a bus 117.

The drive control integrated circuit 112 controls the operation of the disk drive 110 in response to commands from the host computer 100. The operation of disk drive 110 typically includes data transfers between the host computer 100 and the disk device 116. During data transfers, the drive control integrated circuit 112 temporarily stores the data in the buffer 114. One example of a drive control integrated circuit that could be adapted in accord with the invention is the AIC-4560 provided by Adaptec of Milpitas, Calif.

The buffer 114 could be any conventional buffer device, such as a Synchronous Dynamic Random Access Buffer (SDRAM). The disk device 116 could be any conventional storage device. The busses 113 and 115 could each be conventional busses. The bus 117 could be conventional bus, such as a NRZ bus.

Those skilled in the art will recognize that some conventional components have been omitted for clarity. For example, a read channel integrated circuit may be coupled in between the drive control integrated circuit 112 and the disk device 116. In addition, the busses 113, 115, and 117 are typically comprised of multiple data, address, and control lines, but are represented as single lines for the purpose of clarity.

In a normal operating mode, the drive control integrated circuit 112 receives a data block along with a write command, data block address, and data block size from the host computer 100 over the bus 105. The drive control integrated circuit 112 transfers the data block to the buffer 114 over the bus 113. The drive control integrated circuit 112 exchanges servo control signals with the disk device 116 over the bus 117 to position the disk device 116 to the data block address. The drive control integrated circuit 112 then transfers the data block to the disk device 116 from the buffer 114 over bus 115 and bus 117 for storage on the disk device 116 at the data block address.

To read the data, the host computer 120 transfers a read command along with the same data block address and data block size used in the write operation to the drive control integrated circuit 112 over the bus 105. The drive control integrated circuit 112 exchanges servo control signals with the disk device 116 over the bus 117 to re-position the disk device 116 to the data block address. The drive control integrated circuit 112 then receives the data block from the disk device 116 over the bus 117. The drive control integrated circuit 112 transfers the data block to the buffer 114 over the bus 115. The drive control integrated circuit 112 then transfers the data block from the buffer 114 to the host computer 100 over the bus 113 and the bus 105.

In a distinct advance in the art, the drive control integrated circuit 112 can operate in a test mode without any connection to the host computer 100. The disk drive 110 includes logic and circuitry that tests the host interface in the drive control integrated circuit 112 by emulating the host computer 100 during testing. The logic and circuitry also measures the performance of the disk drive 110 during the testing to provide an indication of success or failure.

Figure 2:
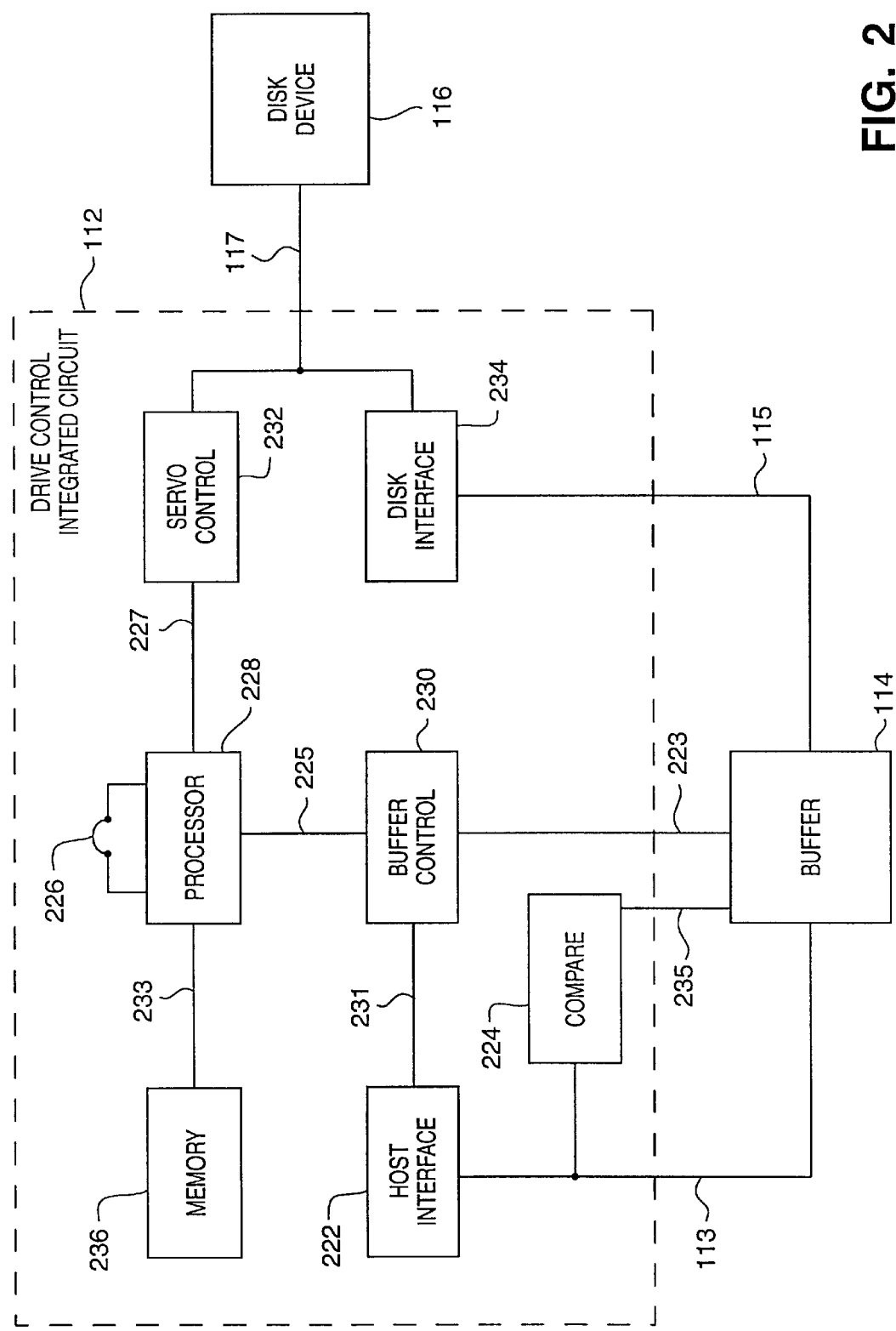
FIG. 2 is a block diagram of a drive control integrated circuit in an example of the invention.

Drive Control Integrated Circuit Configuration —FIG. 2

FIG. 2 depicts the drive control integrated circuit 112 configured to perform testing in accord with the invention. Note that the drive control integrated circuit does not need to be connected to the host computer 100 to perform testing. The drive control integrated circuit 112 comprises: host interface 222, compare circuitry 224, jumper 226, processor 228, buffer control 230, servo control 232, disk interface 234, and memory 236.

The host interface 222 is connected to the buffer 114 over the bus 113. The host interface 222 is connected to the buffer control 230 over path 231. The compare circuitry 224 is connected to the bus 113. The compare circuitry 224 is connected to the buffer 114 over path 235. The processor 228 is connected to the jumper 226. The processor 228 is connected to the buffer control 230 over path 225. The processor 228 is connected to the servo control 232 over path 227. The processor 228 is connected to the memory 236 over path 233. The buffer control 230 is connected to the buffer 114 over the path 223. The buffer 114 is connected to the disk interface 234 over the bus 115. The servo control 232 and the disk interface 234 are connected to the disk device 116 over the bus 117.

In normal operating mode, the host interface 222 has host registers that store host commands that are received over the bus 105 from the host computer 100. The host interface 222 then exchanges data between the host computer 100 and the buffer 114 over the bus 113. The disk interface 234 exchanges the data between the buffer 114 and the disk device 116 over the bus 115 and the bus 117. Thus, a data block is transferred sequentially through the following elements during a write operation: host interface 222, bus 113, buffer 114, bus 115, disk interface 234, bus 117, and disk device 116. The data block follows a reciprocal path during a read operation.

In test mode, host commands are not received from the host computer 100. Instead, the buffer control 230 transfers test commands from the buffer 114 to the host registers in the host interface 222 over the path 223 and the path 231. The buffer control 230 transfers the test commands in response to a test pointer initiated by the processor 228. The buffer control 230 automatically increments the test pointer and continues to transfer commands until to the host interface 222 until a stop test instruction is encountered.

The processor 228 controls the operation of the drive control integrated circuit 112 in response to the commands received into the host interface 222 from the host computer 100. To control operation, the processor 228 executes instructions retrieved over path 233 from the memory 236. Some of the instructions cause the processor 228 to control read and write operations. Another portion of the instructions cause the processor 228 sense the jumper 226 and initiate a test pointer. The test pointer causes the buffer control 230 to transfer test commands from the buffer 114 to the host interface 222 over the path 223 and the path 231. The test commands emulate the commands typically received from the host computer 100.

The servo control 232 exchanges signals with the processor 228 over the path 227 and with the disk device 116 over the bus 117. The servo control 232 generates control signals for the disk device 116. The control signals properly position the disk device 116 to the data block address required for the read or write operation.

The compare circuitry 224 obtains copies of written data from the buffer 114 over the path 235. During a subsequent read operation for the same data, the compare circuitry 224 copies the data from the bus 113 when it is transferred to the host interface 222. The compare circuitry 224 compares the test data that is written with the test data that is read. If the test data matches, then the test is successful. If the test data does not match, then the test is a failure and an alarm is generated.

The jumper 226 is installed to initiate testing. The processor 228 must sense the jumper 226 to perform tests. If the jumper is removed, the processor 228 senses that testing cannot be performed.

Figure 3:
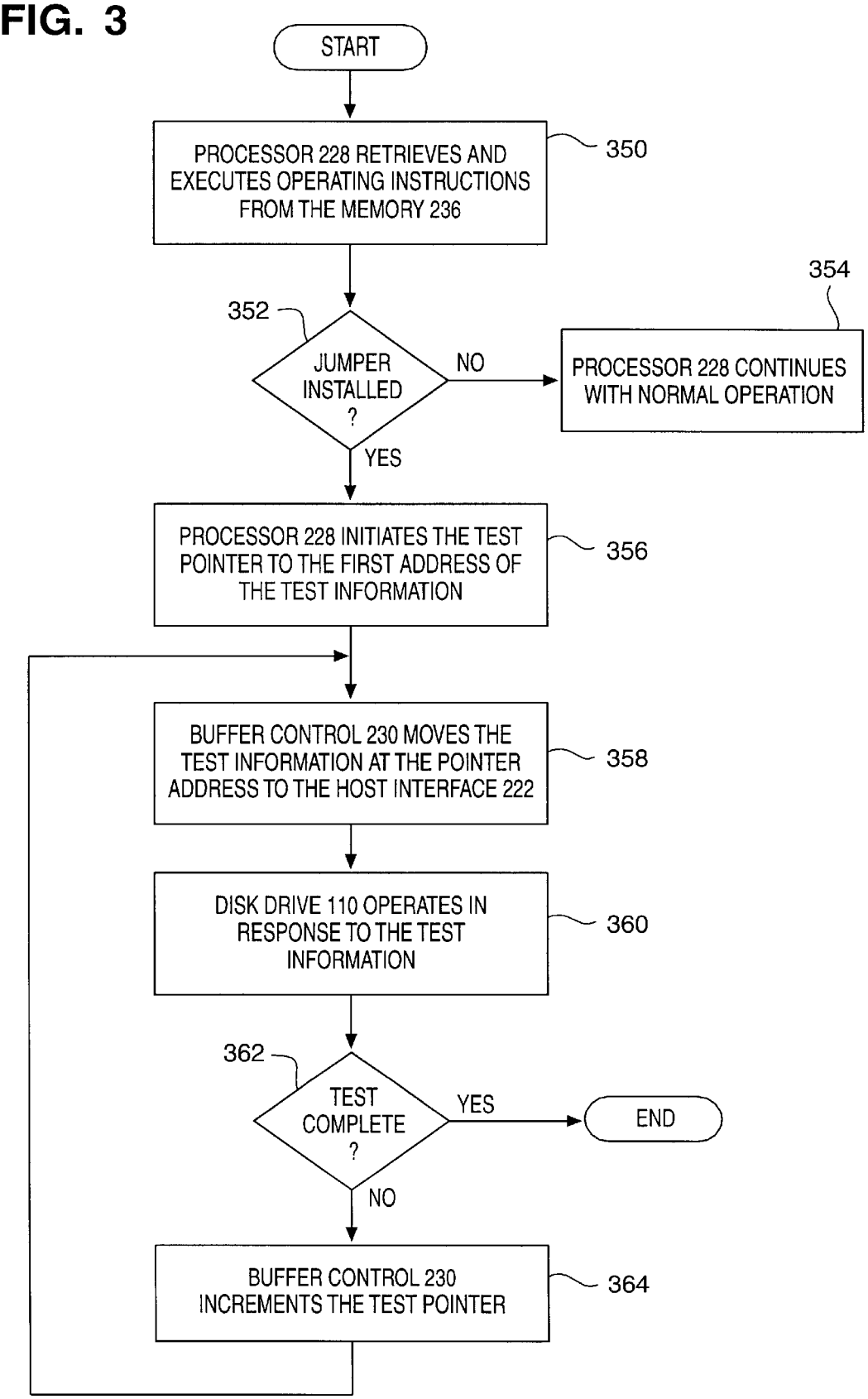
FIG. 3 is a flow diagram of the operation of the drive control integrated circuit in an example of the invention.
Figure 4:
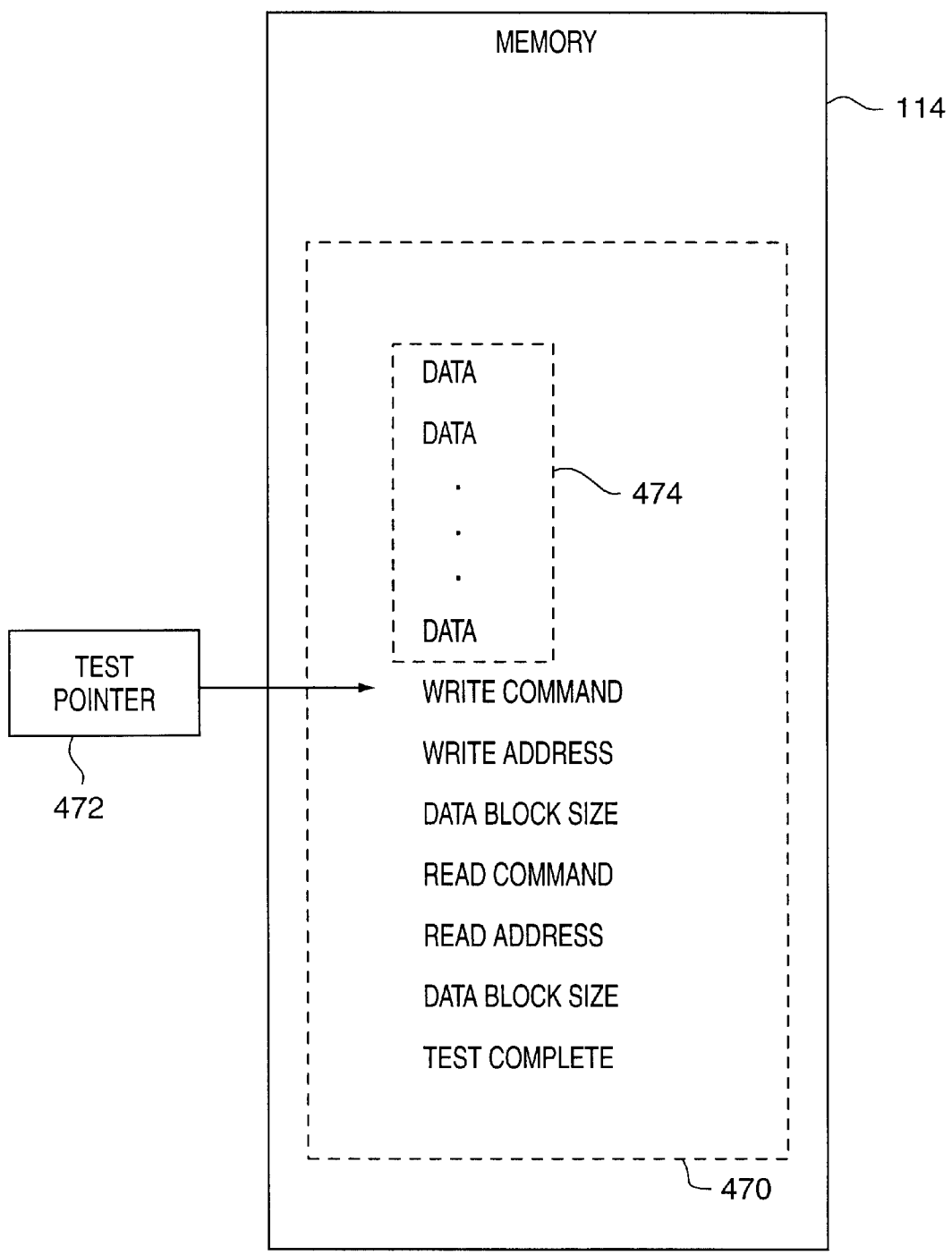
FIG. 4 is a block diagram of a buffer in an example of the invention.
Figure 5:
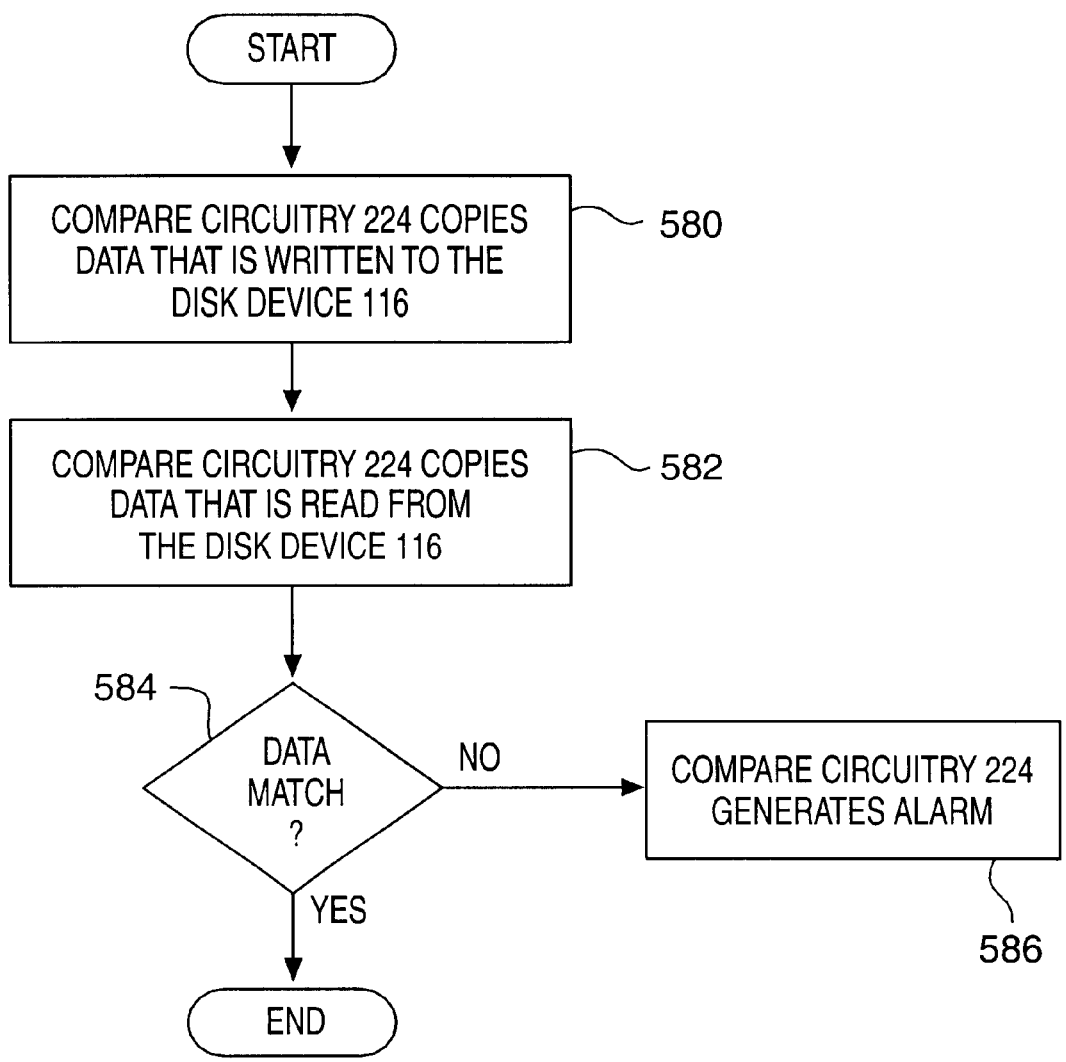
FIG. 5 is a flow diagram of the operation of the compare circuitry in an example of the invention.

Test Operation FIGS. 3–5

FIG. 3 depicts the operation of the drive control integrated circuit 112 during testing. The process starts when the processor 228 retrieves and executes operating instructions from the memory 236 in step 350. One of the instructions causes the processor 228 to determine if the jumper is installed in step 352. If the jumper is not installed, then the processor 228 continues with normal operation in step 354. If the jumper is installed, then the processor 228 initiates the test pointer to the first address of the test information in step 356. The buffer control 230 moves the test information at the pointer address to the host interface 222 in step 358. The disk drive 110 operates in response to the test information in step 360. The buffer control 230 determines if the test is complete in step 362. If the test is not complete, then the buffer control 230 increments the test pointer in step 364 and processing returns to step 358. The testing ends when the buffer control 230 determines that the test is complete.

Typically, testing entails a write operation and a subsequent read operation. In the write operation, test data is transferred from the buffer 114 to the disk device 116. In the read operation, the data is read from the disk device 116 and transferred back to the host interface 222 through the buffer 114. The compare circuitry 224 compares written data to the data that is read to generate a test result.

FIG. 4 depicts test information 470 that is stored in the buffer 114. The test information 470 is exemplary and has been restricted for clarity. For example, the test information 470 could include multiple read/write operations implemented with loopback processing logic. Those skilled in the art will recognize additional information that could be included in the test information 470. The test pointer 472 points to the test information that the buffer control 230 transfers from the buffer 114 to the host interface 222. The buffer control 230 automatically increments the test pointer 472 and continues to transfer the test information to the host interface 222 until a test complete instruction is encountered. As a result, the disk drive 110 continues to operate on the test information in the host interface 222 until the test is complete.

The processor 228 initiates the test pointer and the buffer control 230 automatically increments the test pointer. In response to the test pointer, the buffer control 230 transfers a write command, write address, data block size to the host interface 222. The buffer control transfers these commands to the same host registers in the host interface 222 as if the host computer 100 had made the transfer over the bus 105. If the disk drive 110 is operating properly, then the data block 474 will be written to the disk at the write address. The compare circuitry 224 copies the data block 474. The buffer control 230 then transfers a read command, read address, and data block size to the host interface 222. The address and data block size is the same as for the previous write operation. If the disk drive 110 is operating properly, the data that was previously written is read and transferred to the host interface 222. The compare circuitry 224 copies this data during the read operation and compares it to the data copied for the write operation. In response to the test complete instruction, the buffer control 230 stops incrementing the pointer and transferring commands to the host interface 222.

FIG. 5 depicts the operation of the compare circuitry 224. The compare circuitry 224 copies data from the buffer 114 that is written to the disk device 116 in step 580.

The compare circuitry 224 subsequently copies data that is read from the same address on the disk device 116 in step 582. The compare circuitry compares the data for a match in step 584. If the data does not match, then alarm is generated in step 586 and the process ends. If the data does match, then the test is successful and the process ends.

It should be appreciated from the above description that the drive control integrated circuit 112 is able to perform self-testing that emulates operation in the field.

Unlike previous testing techniques, the invention does not require elaborate test equipment configurations and labor, but still performs robust testing of the entire disk drive, including the host interface and associated host interface processing.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for operating a drive control integrated circuit to test a disk drive, wherein the drive control integrated circuit comprises a processor and a host interface, the method comprising:

processing an instruction in the processor;

transferring a test command from a disk drive buffer to the host interface in response to processing the instruction;

controlling operation of the disk drive in response to the test command in the host interface; and measuring performance of the disk drive after the operation of the disk drive.

2. The method of claim 1 further comprising sensing a jumper by the processor in response to processing the instruction.

3. The method of claim 1 further comprising initiating a test pointer to the test command in response to processing the instruction.

4. The method of claim 3 further comprising transferring the test command from the buffer to the host interface in response to the test pointer.

5. The method of claim 1 wherein the test command includes a write command and a data block address.

6. The method of claim 5 wherein the test command includes a read command and the data block address.

7. The method of claim 6 wherein controlling the operation of the disk drive in response to the test command in the host interface comprises controlling a write operation and a read operation.

8. The method of claim 7 wherein measuring performance of the disk drive after the operation of the disk drive comprises comparing a data block written during the write operation with another data block read during the read operation.

9. The method of claim 8 further comprising generating an alarm if the data block written during the write operation does not match the other data block read during the read operation.

10. A disk drive control integrated circuit that comprises:

a host interface that is operational to receive commands and an address from a host computer over a bus when the bus is connected to the host interface, and to exchange a data block with the host computer over the bus when the bus is connected to the host interface;

a processor that is operational to process instructions to initiate a pointer;

a buffer control that is coupled to the processor and to the host interface and that is operational to transfer the commands and the address from a buffer to the host interface in response to the pointer; and compare circuitry that is coupled to the buffer and that is operational to compare a data block that is written to the address with another data block that is read from the address.

11. The disk drive control integrated circuit of claim 10 further comprising a jumper that is operational when removed to indicate to the processor that testing cannot be performed.

12. The disk drive control integrated circuit of claim 10 wherein the processor is further operational to control a write operation and a read operation in response to the commands that are transferred into the host interface from the buffer.

13. The disk drive control integrated circuit of claim 10 wherein the compare circuitry is further operational to generate an alarm if the data block that is written to the address does not match the data block that is read from the address.

* * * * *